June 13, 1950  K. W. HARRISON  2,511,468
ELECTRICAL CONTROL NETWORK
Filed Jan. 9, 1946

Inventor
Kenneth Whiteley Harrison
by Pierce & Scheffler
his attys

Patented June 13, 1950

2,511,468

UNITED STATES PATENT OFFICE 2,511,468

ELECTRICAL CONTROL NETWORK

Kenneth Whiteley Harrison, London, England, assignor to Telephone Manufacturing Company Limited, London, England Application January 9, 1946, Serial No. 640,117
In Great Britain January 15, 1945

1 Claim. (Cl. 178—44)

This invention relates to electrical control networks in which the transfer of electrical energy is controlled by the "opening" or "closing" of suitably poled rectifying elements actuated on the application, in a suitable sense, of a controlling, modulating or keying current.

Networks arranged and constructed according to the invention have the useful property of presenting in their "open" and "closed" conditions, both to their input and output terminals impedances substantially constant and equal to the correct terminating impedance of the input line and to the correct input impedance of the system connected to the output of the control network. They, furthermore, present substantially linear impedances.

Networks so constructed and arranged to possess such properties comprise circuit elements symmetrically disposed in a balanced system.

All circuits contemplated utilise series of longitudinal rectifying elements and transverse or shunt rectifying elements and the series sets of elements when in the "open" or "forward" conduction condition serve to allow a practically direct transfer of energy, the shunt elements being simultaneously biased in the "closed" or backwardly conducting condition and becoming virtually a high impedance shunt.

On the other hand, the shunt elements when biased in the "open" or forwardly conducting condition being preferably arranged in pairs, back-to-back, serve substantially as linear low impedance elements and in this state virtually act as a short circuit and prevent any effective transfer of energy through the network. Simultaneously, the series rectifiers are brought into the "closed" condition, and present individually a high impedance also thus aiding in preventing or limiting energy transfer.

Further features of the invention lie in the use of resistances bridging all of the series rectifier elements and, it may be, the shunt rectifier elements. By suitably proportioning these resistances the desirable characteristic of presenting correct terminal impedance values hereinbefore referred to can be obtained.

Figure 1:
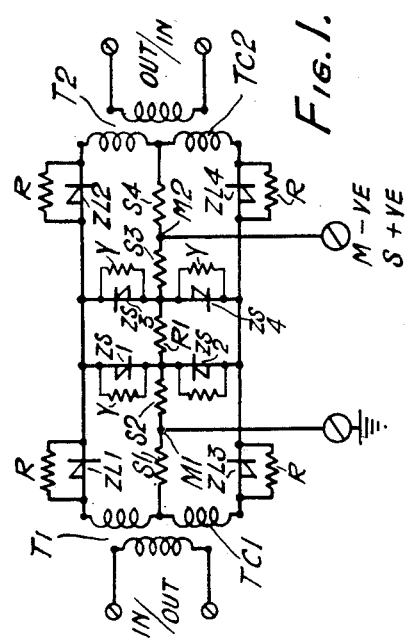
Figure 1A:
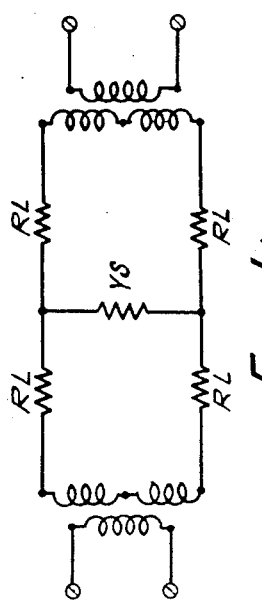

In order that the invention may be more clearly understood and readily carried into practice, it is illustrated, by way of example only, in the accompanying drawings, in which:

Figure 1 represents a circuit which is effectively equivalent to an H pad network as shown diagrammatically in Figure 1a.

Figure 2:
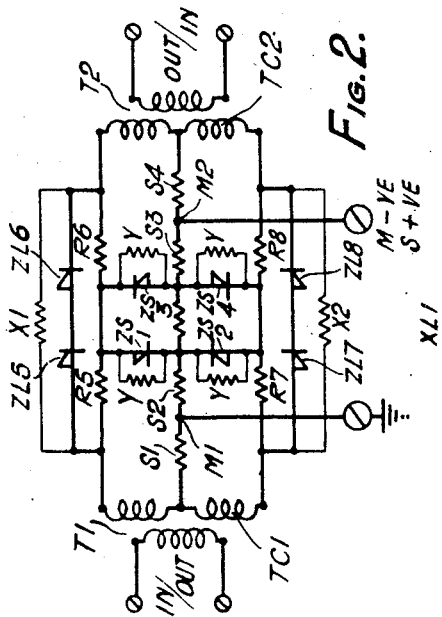
Figure 2A:
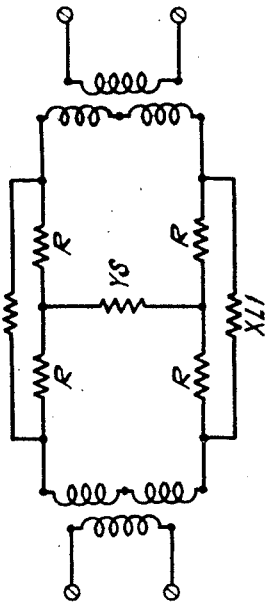

Figure 2 indicates a circuit which is effectively equivalent to a pad network of bridged T type as shown diagrammatically in Figure 2a.

Referring to Figure 1, it will be seen that between two transformers T1 and T2 provided with centre tapped winding TC1, TC2 there are disposed longitudinal or series pairs of rectifiers ZL1, ZL2 and ZL3, ZL4, each bridged by a resistance R. Centrally in shunt across the paths joining these rectifiers there are arranged four rectifiers connected back-to-back in pairs ZS1, ZS2, and ZS3 and ZS4, each of which is bridged by a resistance Y.

Between the centre tappings of winding TC1 and TC2 there are connected five resistances S1, S2, R1, S3 and S4. Of these, the resistance R1 forms a diagonal of the rectifier bridge constituted by the four rectifiers ZS1, ZS2, ZS3 and ZS4. A pair of the resistances S1 and S2 are connected in series to the centre tapping on TC1 and the similar pair of series resistances S3, S4 to the centre tapping on TC2. Through the junctions M1 and M2 of these pairs of resistances S1, S2 and S3, S4 the controlling current is passed. When M2 is rendered negative as compared with M1 current passes through the rectifiers ZL1, ZL2, ZL3 and ZL4 in the forward direction and the paths comprising these rectifiers open.

Conversely, owing to the voltage drops across the resistances S1 and S4, current tends to pass around the bridge ZS1, ZS2, ZS3 and ZS4 in such a sense that the rectifiers in this bridge pass into the "backward" or "closed" condition, so that the effective impedance of the bridge as a path becomes that of the backward value of one of these rectifiers.

A reverse effect takes place if M1 is rendered negative as regards M2. In this case, the longitudinal groups of rectifiers ZL1, ZL2, ZL3 and ZL4 become of high impedance value, whilst the rectifier bridge constitutes a virtual short circuit.

Resistance R1 is made of such value that the control currents in each sense are equal.

This network may also be regarded as an outer bridge containing rectifiers diagonally shunted by the inner central rectifier bridge.

Referring to the actual impedance values of elements of one typical system of this type, the following values are given as an example only.

All the rectifiers in the figure designated by z are of equal value. When in the "open" or forward conducting condition the impedance of such unit is 40 ohms.

In the reverse sense it reaches a value of say 300,000 ohms. It is desired to present to the input line a terminating impedance of 2,400 ohms.

Each of the resistances which bridges a rectifier of the ZL group is given a value of 1,180 ohms.

When all rectifier impedances ZL1 and the like are in the "open" state the terminating impedance of the line is practically that of the terminated line at the output (set at 2,400 ohms.)

When the rectifiers ZL1 and the like become "closed" then each of the same rectifiers bridged by its respective resistance becomes of an impedance approximately=1,180 ohms and the rectifier bridge ZS1 and the like become=40 ohms. The impedance presented to the input=1,180+1,180+40=2,400 ohms as desired. Viewed from the output end of the network a precisely similar effect is produced—the two systems (input and output) are merely linked through the open central bridge impedance of 40 ohms which produces little or no energy transfer. In this case the control network shows relative attenuations of 46 db. and 0.6 db. in the two conditions.

Referring to the alternative system indicated in Figures 2 and 2a, the two transformers T1 and T2 have their centre tappings connected to a central bridge of rectifiers through a series of resistance S1, S2, R1, S3 and S4 exactly as in the circuit hereinbefore described, but pairs of fixed resistances R5, R6 and R7, R8 extend between the transformer terminations, and the mid-junctions J1 and J2, of these resistances, are connected to diagonally opposite connections of the bridge. In this case, however, each pair of resistances R5—R6 and R7—R8 is bridged by rectifier groups ZL5—ZL6 and ZL7—ZL8 and it may be by a resistance X1 and X2 respectively.

Controlling current is, in this arrangement, also fed to the points M1 and M2 and acts as in the first described system, in such a way that reversal of polarity between these points causes in one case low attenuation and in the other high attenuation whilst maintaining substantially the same input and output terminating impedances.

This network may be also regarded as an outer resistance bridge diagonally shunted by the central rectifier bridge; the series pairs of resistance being bridged by rectifier groups. Networks of the types constructed according to the invention are applicable in cases wherein an impedance network is to be regulated or changed by a controlling current, and are particularly useful as controlling or keying devices in telegraphy, echo suppression control circuits and the like.

A useful feature of this network lies in the fact that the rectifier elements are shunted by relatively low resistors, the effect of which is to nullify, to a high degree, variation in the backward impedance of the said elements due to ageing, temperature, variation and the like, thus resulting in a stable performance of the network under varying conditions of time, temperature and the like.

It will be understood that whilst the foregoing description of two preferred constructional circuit systems is given by way of example, the invention is not limited in its application to such specific forms of circuit but may be applied by those versed in the art to circuits operating in similar manners without departing from its essential nature.

What I claim and desire to secure by Letters Patent is:

An electrical control network comprising; input and output transformers the secondaries of which are mid-tapped and have their winding ends interconnected by pairs of series connected rectifiers, the two pairs preventing the passage of current in the same direction, as between one transformer and the other; a rectifier bridge comprising two opposed pairs of series arranged rectifiers connected in shunt across the conductors interconnecting the transformer secondaries at points intermediate the associated secondary interconnection rectifiers; a balancing resistor connecting the rectifier pairs which form said bridge at points intermediate the rectifiers of each pair, a pair of series resistors connected between each of the latter points and the mid tap of each transformer secondary, the respective junction points between the resistors of each pair constituting input terminals for current by which the attenuation of the network is controlled, and relatively low valued resistors connected respectively in shunt with all of said rectifiers.

KENNETH WHITELEY HARRISON.

REFERENCES CITED

The following references are of record in the file of this patent:

UNITED STATES PATENTS

| Number | Name | Date |
|---|---|---|
| 1,992,774 | Ryall | Feb. 26, 1935 |
| 2,021,920 | Norwine | Nov. 26, 1935 |
| 2,212,832 | Holzler | Aug. 27, 1940 |
| 2,338,410 | Cousins | Jan. 4, 1944 |

FOREIGN PATENTS

| Number | Country | Date |
|---|---|---|
| 438,839 | Great Britain | Nov. 25, 1935 |
| 109,355 | Australia | Dec. 11, 1939 |

OTHER REFERENCES

Standard Handbook for Electrical Engineers, section 9, pages 836–837, paragraphs 10, 11 and 12, McGraw Hill Book Co., Inc., 1941.